(12) United States Patent
Ronan et al.

(10) Patent No.: US 6,277,464 B1
(45) Date of Patent: *Aug. 21, 2001

(54) POLYMERIC INTEGRAL NET

(75) Inventors: John B. Ronan, Bergen County, NJ (US); David E. Newman, Suffolk County, NY (US); Scott Hopkins, Tompkins County, NY (US); Jeffrey B. Burns, Suffolk County, NY (US)

(73) Assignee: Pall Corporation, East Hills, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/858,082

(22) Filed: May 16, 1997

(51) Int. Cl.$^7$ .................................. B32B 3/10; B32B 3/16
(52) U.S. Cl. ..................... 428/131; 428/134; 428/304.4; 428/315.5; 521/52; 521/143; 521/145; 264/156; 264/158; 264/159
(58) Field of Search ..................... 428/131, 134, 428/304.4, 315.5; 521/52, 143, 145; 264/156, 158, 159

(56) References Cited

U.S. PATENT DOCUMENTS

| | | | |
|---|---|---|---|
| 3,441,638 | 4/1969 | Patchell et al. | 264/154 |
| 3,922,329 | 11/1975 | Kim et al. . | |
| 4,226,828 | 10/1980 | Hall | 264/555 |
| 4,574,100 | 3/1986 | Mercer . | |
| 4,647,416 | 3/1987 | Seiler, Jr. et al. . | |
| 4,873,034 | * 10/1989 | Kono et al. | 264/41 |
| 4,876,051 | 10/1989 | Campbell et al. . | |
| 4,964,992 | * 10/1990 | Goldsmith et al. | 210/500.36 |
| 4,978,486 | 12/1990 | Ito et al. . | |
| 5,051,183 | * 9/1991 | Takita et al. | 210/500.36 |
| 5,364,682 | 11/1994 | Tanaka et al. . | |
| 5,514,231 | 5/1996 | Thomas | 156/62.2 |
| 5,571,413 | * 11/1996 | Mogami et al. | 210/489 |
| 5,858,505 | * 1/1999 | Moen et al. | 428/131 |

FOREIGN PATENT DOCUMENTS

| | | |
|---|---|---|
| 1106254 | 3/1968 | (GB) . |
| 1128977 | 10/1968 | (GB) . |
| 1331775 | 9/1973 | (GB) . |

OTHER PUBLICATIONS

Tsutomu, M., "Perforated Sheet and Molding Thereof", Patent Abstracts of Japan, Publ. No. 0307071826, Publ. Date Mar. 27, 1991.

Lenzing AG Product Catalogue (Lenzing Films, Sep., 1996).

"The National Technology Roadmap for Semiconductors", Table 59 Defect Prevention and Elimination Technology Requirement, 1997.

"The International Technology Roadmap for Semiconductors: 1999", Table 80a Defect Prevention and Elimination Technology Requirements—Near Term, 1999.

* cited by examiner

Primary Examiner—Elizabeth M. Cole
Assistant Examiner—Christopher C. Pratt
(74) Attorney, Agent, or Firm—Leydig, Voit & Mayer, Ltd.

(57) ABSTRACT

The present invention provides an integral net having a lattice of polymeric material defined by holes traversing the integral net from one surface to the other. The present invention also provides a method for producing an embossed sheet of polymeric material by first contacting a billet of polymeric material with an embossing tool having a plurality of protrusions whereby the embossing tool impresses indentations into the billet to a given depth. Subsequently, the method involves skiving the embossed billet. By this method, an embossed sheet of the polymeric material is removed from the billet, which embossed sheet can be an integral net.

26 Claims, 7 Drawing Sheets

POLYMERIC INTEGRAL NET

TECHNICAL FIELD OF THE INVENTION

The present invention relates to an integral net of polymeric material and a method for producing the same.

BACKGROUND OF THE INVENTION

Polymeric nets or webs are sheet-like fenestrate structures comprising polymeric material. Polymeric nets find utility in a variety of disparate applications ranging from electronics to medical care, and such nets are thus commercially important materials. These nets can have different qualities depending upon their mode of engineering. For example, such nets can be fashioned from a variety of polymers, have a variety of hole sizes and shapes, and can assume almost any desired thickness.

In many applications, it is desirable to have nets fashioned from relatively inert matter in order to avoid compromising the integrity of the net lattice or affecting materials in contact with the net. Polymers represent attractive choices for nets to be employed in these applications, as many polymers are extremely resistant to most chemicals. In fact, fluoropolymers such as polytetrafluoroethylene (PTFE) rank as some of the most chemically inert materials. Thus, nets of fluoropolymers would be highly useful in applications in which the nets are exposed to harsh conditions, such as in batteries, filtration apparatuses, and the like.

In other applications, it is desirable to fashion nets to include a minimal amount of extractable material, as such matter can affect the physical and chemical properties of the polymeric lattice, and hence the net, as well as contaminate materials in contact with the net. Nets comprising reactive extractable material are changed or degraded over time as the extractable material is removed from the net. Perhaps more importantly, in other applications, such as filtration devices in which nets are employed as filter media or as support elements, the presence of extractable matter in the net lattice adversely affects the ultimate quality of the filtrate. Notably, extractable matter can be leached from the net lattice, thus contaminating the filtrate and/or filtered material.

It is also often desirable to have extremely thin polymeric nets and nets with very small, regularly shaped holes or pores. Such nets are useful in filtration devices, especially ultrafiltration devices, for removing very small particles (e.g., microbes) from a fluid. Furthermore, very thin nets minimize the pressure differential across a filter during filtration, thus enhancing the efficiency of some types of filtration (e.g., dynamic or crossflow filtration).

Typically, many types of polymeric nets are manufactured by extrusion, by weaving, by knitting, or by punching holes or slits into a sheet of polymeric material. It is very difficult and costly to control the size and shape of holes or pores in nets produced by many of these processes, especially where very small and uniform holes are required and for very thin nets. Moreover, many commonly employed processes for fabricating nets, especially extrusion, are prone to introduce a significant amount of extractable matter (e.g., metals, resins, etc.) into the polymer lattice.

Thus, there exists a need for a net substantially free of extractable matter and a very thin net having substantially uniform hole size and shape. The present invention provides such a polymeric net, as well as a method of preparing same. These and other advantages of the present invention, as well as additional inventive features, will be apparent from the description of the invention provided herein.

BRIEF SUMMARY OF THE INVENTION

The present invention provides an integral net having a lattice of polymeric material defined by holes traversing the integral net from one surface to the other. The present invention also provides a method for producing an embossed sheet of polymeric material by contacting a billet of polymeric material with an embossing tool having a plurality of protrusions whereby the embossing tool impresses indentations into the billet to a given depth, and subsequently skiving the embossed billet. By this method, an embossed sheet of the polymeric material is removed from the billet, which embossed sheet can be the aforesaid integral net.

The present invention is useful in applications utilizing nets or fibers, such as in medical devices or products, gas exchange or oxygenator devices, electronic devices, in separation applications, or other applications allowing for the use of polymeric nets or fibers.

The invention is best understood with reference to the accompanying drawings and in the following detailed description of the preferred embodiments.

BRIEF DESCRIPTION OF THE DRAWINGS

FIG. 1B is a magnified schematic representation of the holes and lattice of one type of integral net depicted in FIG. 1A, and FIG. 1C is a similar magnified schematic representation of the holes and lattice of an alternative type of integral net.

FIG. 3A is a schematic side view representation of a cylindrical billet of polymeric material and a rotary spur-type embossing tool and the impressions made by the embossing tool into the surface of the billet. FIG. 3B is a schematic representation of a cylindrical billet of polymeric material with a sheath-type embossing tool. FIG. 3C is an end view depicting a cylindrical billet of polymeric material within a sheath-type embossing tool. FIG. 3D is schematic representation of a planar billet of polymeric material with a press-type embossing tool. FIG. 3E is a cross-sectional side view of FIG. 3D depicting a planar billet of polymeric material with a press-type embossing tool. FIG. 3F is schematic representation of a hollow billet of polymeric material with a rotary spur-type embossing tool. FIG. 3G is schematic representation of a planar billet of polymeric material with a rotary spur-type embossing tool.

FIG. 4A is a schematic side view representation of a cylindrical billet of polymeric material having impressions made by an embossing tool into the surface of the billet, a blade for skiving an embossed sheet from the billet, and a sheet having an embossed pattern. FIG. 4B is a schematic representation of a planar billet of polymeric material having impressions made by an embossing tool into the surface of the billet, a blade for skiving an embossed sheet from the billet, and a sheet having an embossed pattern.

FIG. 5A represents a pyramidal protrusion, while FIG. 5B represents a conical protrusion.

DESCRIPTION OF THE PREFERRED EMBODIMENTS

Figure 1A:
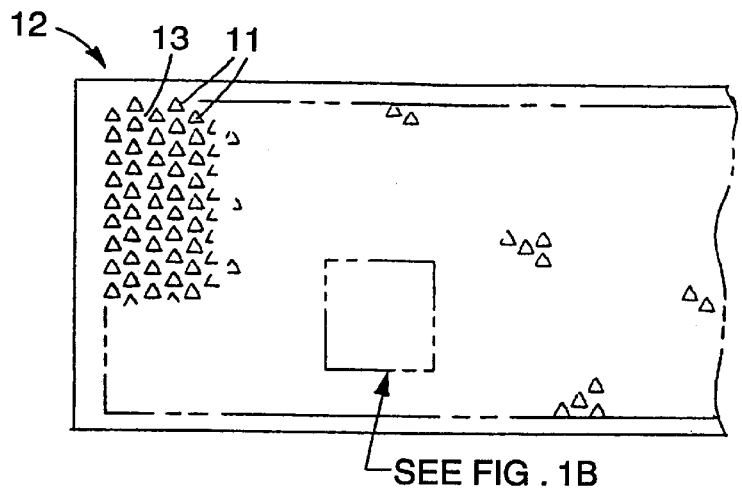
FIGS. 1A–1C are schematic representations of the surfaces of polymeric integral nets of the present invention.

The present invention provides a nonwoven, nonextruded, integral reticulate net (such as a single-layer net) having a lattice of polymeric material defined by holes or by pores. As used herein, a net is any fenestrate sheet having holes traversing the sheet from one surface to the other. Preferably, the integral net is non-extruded in order to minimize the presence of extractable matter (e.g., metals, resins, and the like) in the net lattice. Also, the net preferably has not been stretched, as stretching can cause variation in lattice structure.

The net can comprise any suitable polymeric material (e.g., virgin, reprocessed, recycled, etc.). Preferably, the integral net comprises polymeric material, such as thermoplastic polymers, etc., and the polymeric net can include filler material, (e.g., glass fillers, carbon fillers, mineral fillers, or other suitable fillers). In many applications, the integral net comprises polymeric material exhibiting superior chemical resistance and skivability, such as, for example, a fluoropolymer, polytetrafluoroethylene (PTFE), or ultra high molecular weight polyethylene (UHMWPE). Examples of suitable fluoropolymers are polychlorotrifluoroethylene (PCTFE), polychlorotrifluoroethylene-co-ethylene (E/CTFE-polymer), polytetrafluoroethylene-co-hexafluropropylene (FEP), polytetrafluoroethylene-co-perfluoro(alkylvinyl ether) (PFA), polytetrafluoroethylene-co-ethylene (E/TFE), polyvinyl fluoride (PVF), polyvinylidene fluoride (PVDF), and copolymers of vinylidene fluoride. Most preferably, the polymer is either PTFE, PFA or UHMWPE. In addition, regardless of the nature of the polymer, integral nets according to the present invention are preferably substantially free of contaminants (e.g., extractable material), such as integral nets consisting essentially of the polymeric material. For example, the net can comprise less than about 500 part per million (ppm) extractable matter, such as less than about 100 ppm or even 50 ppm extractable matter (e.g., less than about 10 ppm extractable matter), such as less than about 1 ppm extractable matter, and more preferably the net comprises less than about 10 part per billion (ppb) metal extractable matter (e.g., about 1 ppb metal extractable matter). Most preferably, integral nets according to the present invention consist entirely of the desired polymer. Thus, preferred integral nets of the present invention can be practically chemically inert, such that the structural integrity of the integral net lattice is maintained even upon prolonged contact with very strong industrial solvents and wherein substantially no material leaches from the integral net lattice into a fluid in contact with the integral net. However, in other applications (such as for use as surgical products, biodegradable packaging, etc.), the polymeric material is preferably reactive material.

Polymeric integral nets of the present invention can be constructed by any suitable means. The integral net can be hydrophilic or hydrophobic; the integral net can have smooth or rough surfaces; and the integral net can be coated or conjugated with other materials (e.g., a surface coating).

Integral nets of the present invention can be of any dimension or form, provided, however, that the integral net is a fenestrate sheet-like structure. Thus, the integral net can be of any desired size, such as several meters in width or length or merely a few centimeters in width or length, or even significantly smaller or larger. Furthermore, the integral net can assume any shape; thus, for example, the integral net can be rectangular, square, round, oval, oblong, polygonal, irregular., or any other desired shape.

While an integral net of the present invention can be of any suitable dimension, it is a sheet-like structure. Thus, the integral net lattice preferably is thin in comparison with its length and breadth; however, the integral net lattice can have any desired thickness. For example, the lattice can be several micrometers thick, although thicker lattices can be one or several millimeters thick, or even thicker (e.g., a centimeter or more in thickness). Accordingly, the lattice desirably has a thickness of about 1000 $\mu$m or less (e.g., about 1–750 $\mu$m), preferably about 500 $\mu$m or less (e.g., about 10–500 $\mu$m), more preferably about 250 $\mu$m or less (e.g., about 50–250 $\mu$m), and most preferably about 200 $\mu$m or less (e.g., about 100–200 $\mu$m). Of course, lattices can be significantly thicker or thinner than these exemplified dimensions. Furthermore, lattice thickness can vary or be uniform (e.g., thicker in some places than in others), and variant lattice thickness can be either gradient or irregular. Preferably, however, the lattice is of approximately uniform thickness throughout, and most preferably the lattice is of substantially uniform thickness.

While the present invention encompasses integral nets having any suitable shape, size, and thickness (provided the integral net is sheet-like), integral nets of the present invention are fenestrate. Thus, an integral net of the present invention has one or more holes or pores traversing its thickness from one surface to the other. An integral net of the present invention can have any suitable number of such holes, but an integral net must have at least one such hole. Preferably, an integral net has an array of holes traversing its thickness, and the array can be either regular or irregular. Moreover, the holes can be of any dimension or size. For example holes can be about a few micrometers wide, or they can be larger, such as about a millimeter wide, or even larger (e.g., about a centimeter or more). Moreover, the integral net can have a plurality of hole sizes, ranging considerably in width. Alternatively, the hole size can be approximately uniform throughout an integral net of the present invention. The exact dimensions for the holes within an integral net of the present invention can vary depending upon the use to which the integral net is to be put. Thus, for example, an integral net having very small holes (e.g., a few micrometers wide) provides an excellent filter for separating particulate matter from a fluid, while an integral net having larger holes (e.g., less than about 1000 $\mu$m wide, particularly 500–800 $\mu$m wide) provides excellent support means for use in filtration devices. A preferred integral net has tapered holes of approximately uniform shape arrayed into a regular pattern. Preferably, the pattern is arranged in columns and rows such that lattice width surrounding each hole is substantially uniform. An example of such an arrangement is the pattern with diamond openings depicted in FIG. 7.

Figure 1B:
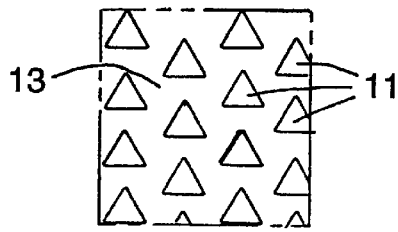
Figure 1C:
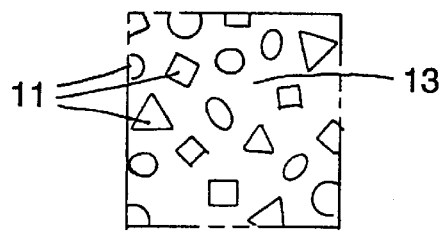

An integral net according to the present invention is schematically depicted in FIGS. 1A–1C. By virtue of the holes 11, the polymeric lattice 13 of the integral net 12 forms a reticular structure. Thus, an integral net 12 preferably comprises a polymeric lattice 13, the structure of which is defined by holes 11 traversing the integral net 12 from one face to the other. Depending upon the placement of the holes 11, the polymeric lattice 13 can be regularly arrayed (FIG. 1B) or irregularly arrayed (FIG. 1C). Moreover, depending upon the size of the holes 11, the polymeric lattice 13 can comprise a majority of the area of the integral net area or the polymeric lattice 13 can comprise a minority of the integral net area.

Figure 7:
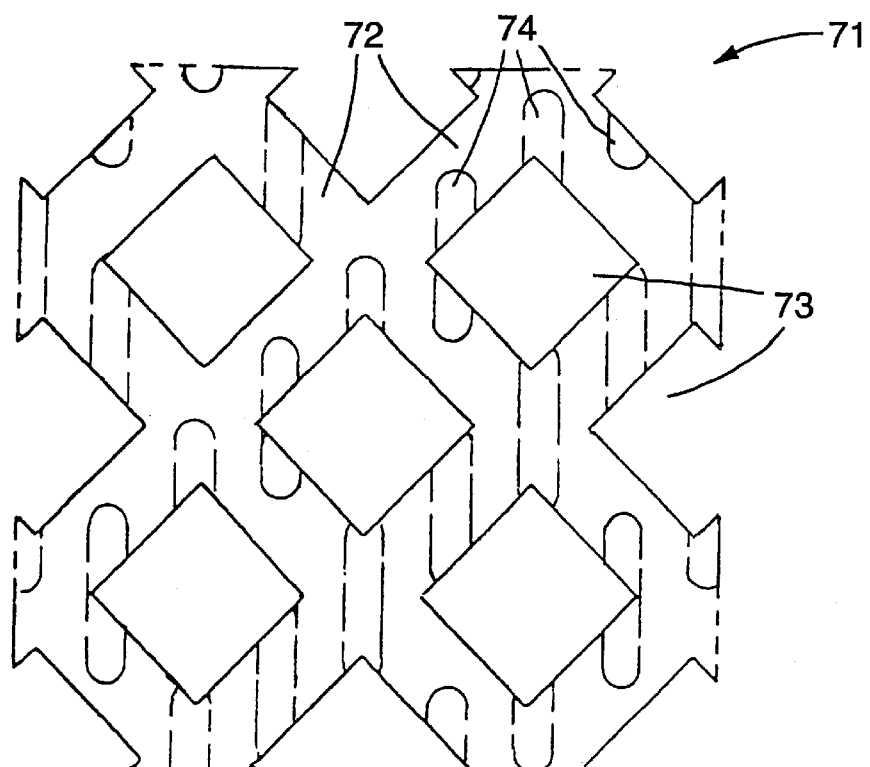
FIG. 7 is a schematic representation of a surface of an embossed sheet or integral net showing a lattice having punctate depressions or furrows between some adjacent holes.

In addition to having holes and a polymeric lattice, an integral net can have additional elements as well. Thus, integral nets can be surface-treated (e.g., by imparting a hydrophilic or hydrophobic coating to the surface of the integral net) or surface-contoured (e.g., to facilitate fluid dynamics). For example, as depicted in FIG. 7, integral nets 71 can have punctate depressions 74 into a surface (or even both opposing surfaces) of its lattice 72. The depressions 74 can form furrows or channels between adjacent holes 73. However, for other applications, the net surface is preferably smooth. Of course, integral nets can have any of a number of other additional features for facilitating their use in varied applications (e.g., integral nets can be charge modified, coated on one or both surfaces with adhesive, stretched, etc.).

The integral net of the present invention is useful in a variety of applications allowing for the use of polymeric nets or fibers, such as in medical devices or products (e.g., as dressing or suture material), gas exchange or oxygenator devices, electronic devices (e.g., as insulation such as in batteries), in separation applications (e.g., as filters or support means within filtration devices), or other applications. Thus, the present invention provides a filtration apparatus having an integral net of the present invention. The filtration apparatus comprises a housing, a process fluid inlet arranged to direct process fluid into the housing, a permeate outlet arranged to direct permeate from the housing, at least one separation element disposed within the housing and including an integral net according to the present invention, a surface of which (i.e., an upstream surface) communicating with the process fluid inlet, and another surface of which (i.e., a downstream surface) communicating with the permeate outlet. The present invention further provides a method of separating matter (e.g., particulate matter) from a process fluid employing such a filtration apparatus.

Figure 2:
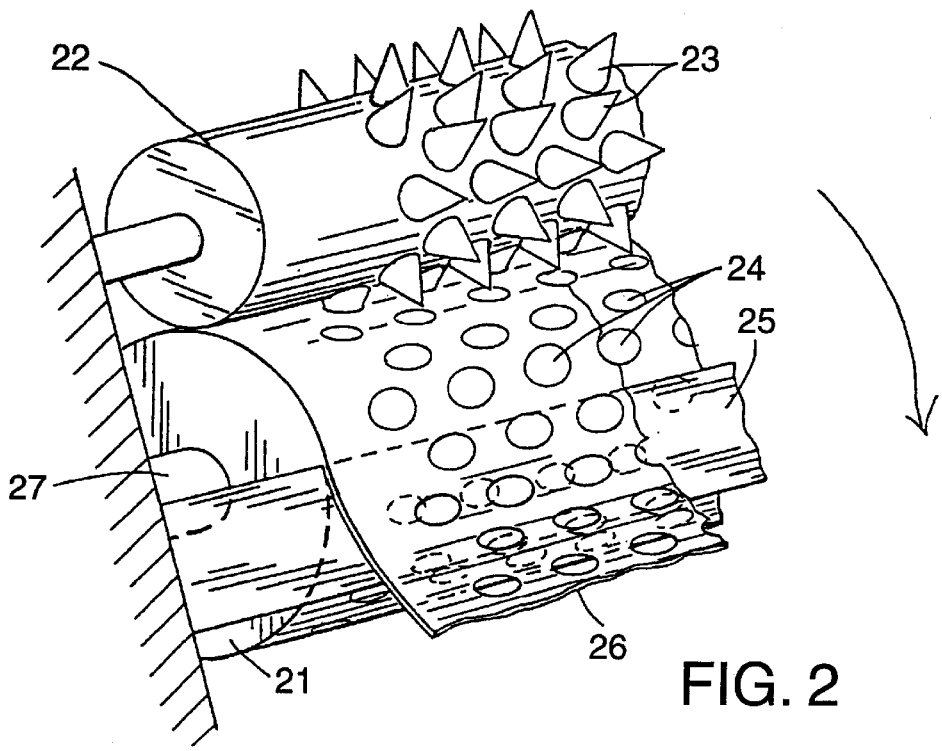
FIG. 2 is a schematic representation of a cylindrical billet of polymeric material with a rotary spur-type embossing tool and a blade for skiving an embossed sheet from the billet.

While the integral net can be produced by any suitable method, the present invention provides a preferred method for producing such a net as well as for producing other embossed sheets (e.g., non-fenestrate sheets). In accordance with the present inventive method, and as schematically depicted in FIG. 2, the embossed sheet 26 is produced from a billet 21. The method preferably makes use of an embossing tool 22 (preferably having protrusions 23, to produce one or more indentations 24 in the billet 21) and a blade 25 for skiving (i.e., slicing the billet 21 tangentially) to produce an embossed sheet 26.

Figure 4A:
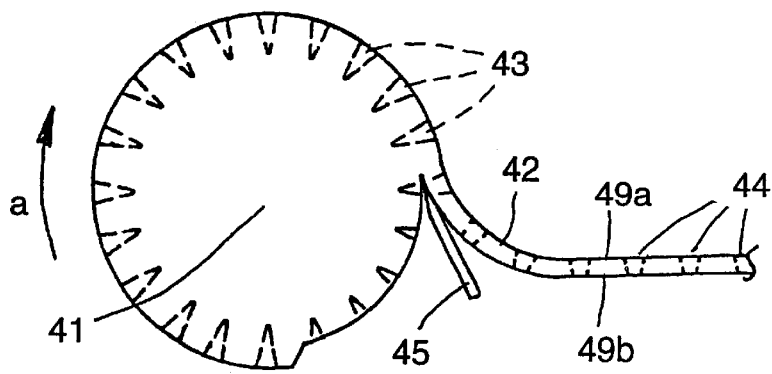
FIGS. 4A–4B are schematic side view representations of embossed billets of polymeric material, blades for skiving embossed sheets from the billets, and embossed sheets having an embossed pattern.
Figure 4B:
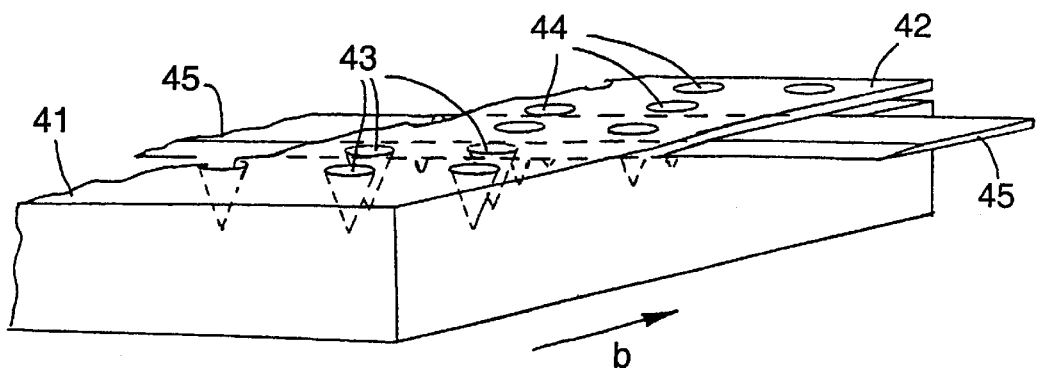

As depicted in FIGS. 4A–B, by this method a patterned embossed sheet 42 of the polymeric material is removed from the billet 41, the embossed sheet 42 having two surfaces 49a, 49b and the embossed pattern 44.

As used herein, including the claims appended hereto, a billet is any block, ingot, or other mass suitable for embossing and subsequent skiving, regardless of its shape or composition. The billet can be formed by any suitable means, such as, for example, by being molded or by other desired means for forming polymeric billets. Most preferably, the billet is formed by a method that greatly minimizes or substantially eliminates the presence of extractable matter. Thus, a preferred billet for use in the present inventive method is an essentially pure mass of the desired polymeric material, such as a billet consisting essentially of the desired polymer, or even a billet consisting entirely of the desired polymer. For example, the billet can comprise less than about 500 parts per million (ppm) extractable matter, such as less than about 100 ppm or even 50 ppm extractable matter (e.g., less than about 10 ppm extractable matter), such as less than about 1 ppm extractable matter, and more preferably the billet comprises less than about 10 part per billion (ppb) metal extractable matter (e.g., less than about 1 ppb metal extractable matter). Of course, the precise means for forming the billet will depend largely upon the nature of the polymeric material, and such means are well known in the art. The billet can comprise any suitable polymeric material (e.g., virgin, reprocessed, recycled, etc.), such as those materials described elsewhere herein. Preferred polymeric materials are those which are readily skived, and the polymeric material also desirably is sufficiently deformable to enable a billet of the polymeric material to be embossed with a suitable device. Most preferably, the billet consists essentially of PTFE, PFA, or UHMWPE.

Figure 3A:
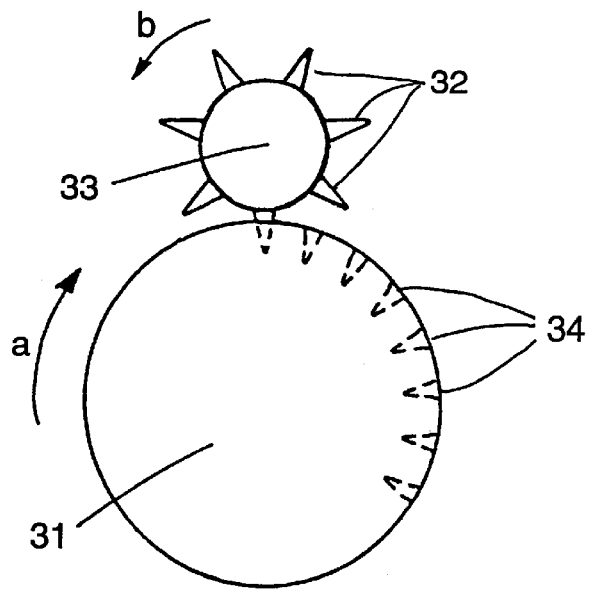
FIGS. 3A–3G are schematic representations of various types of polymeric billets with embossing tools.
Figure 3B:
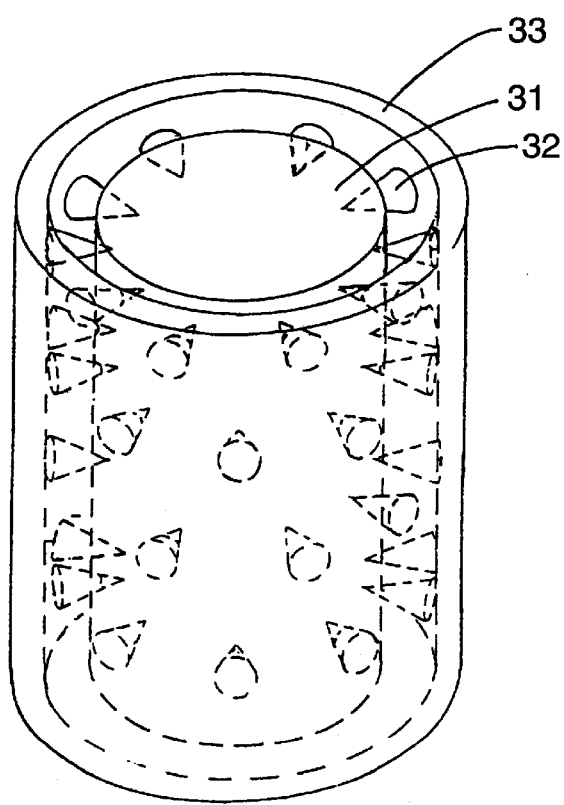
Figure 3C:
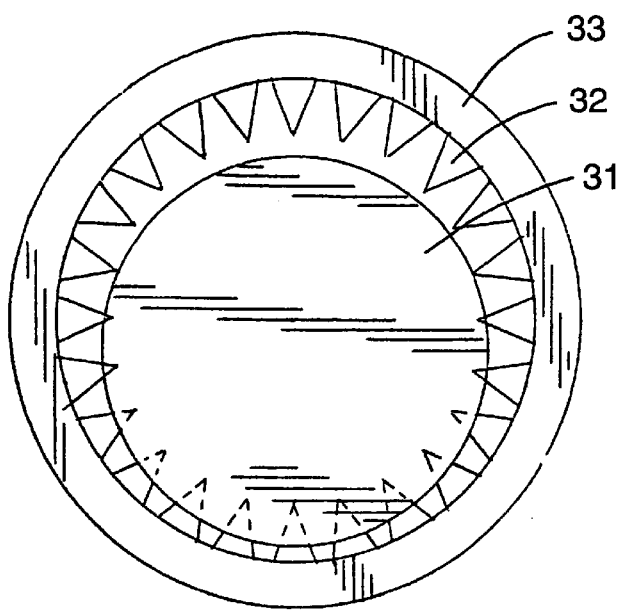
Figure 3D:
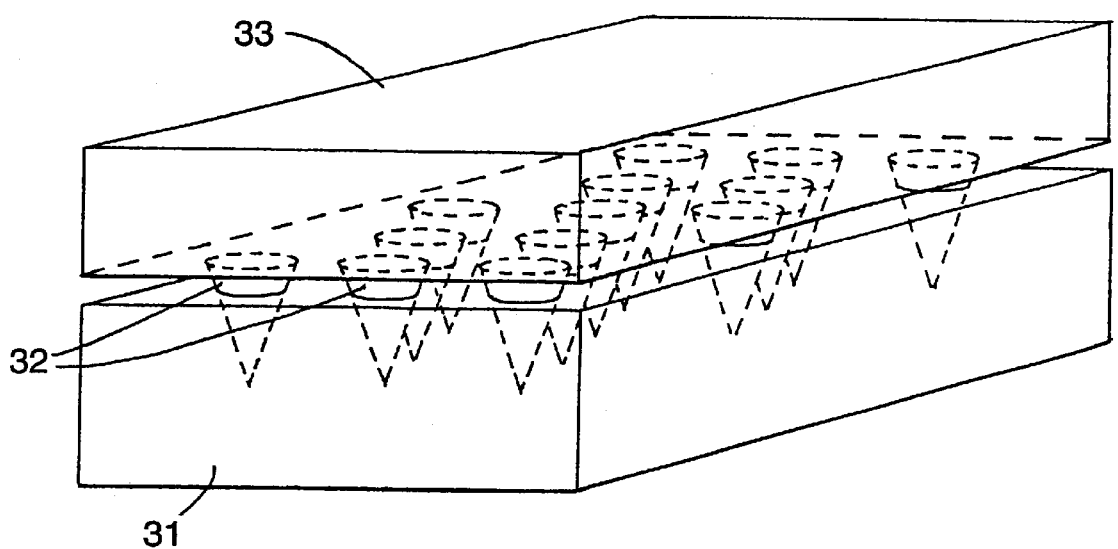
Figure 3E:
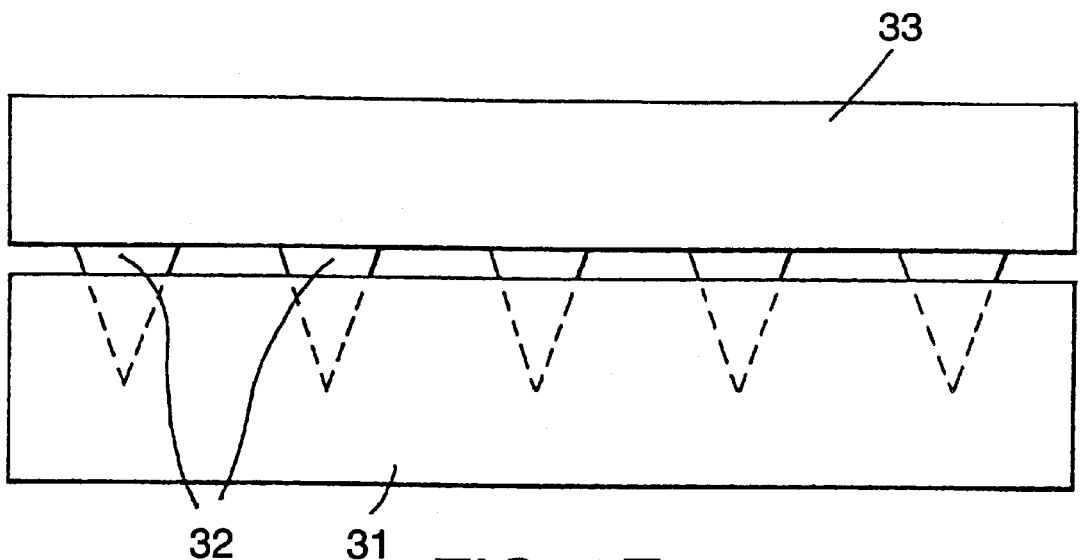

A billet of polymeric material for use in the present inventive method can have any suitable shape or dimensions. For example, as depicted in FIG. 2, a billet 21 can be a cylinder. Such a billet 21 can be solid or recessed for positioning on a mandrel 27. In other embodiments, a billet 31 can be hollow (FIG. 3F) or planar (FIGS. 3D–3E). Moreover, billets can have any other desired surface characteristic (i.e., contoured, concave, convex, etc.). Moreover, where a billet is planar, it can be of any desired shape. For example, the surface of a planar billet can be square, round, oval, oblong, polygonal, etc., or even irregular.

As depicted in FIGS. 3A–3G, the present inventive method involves first embossing the billet 31 such that indentations 34 are introduced into a surface of the billet 31 to a given depth. Any means of embossing the billet 31 is within the scope of the present inventive method. Thus, the billet 31 can have indentations 34 formed by separately impressing indentations 34 into the billet 31 (i.e. reforming the surface of the billet 31), such as with a punch, one or more embossing tools, or other suitable means or device. Alternatively, the indentations 34 can be formed by removing material from the billet 31, (such as with a drill or other device, by photo etching, by chemically etching, or via other suitable treatment). preferably, the billet 31 is embossed by using an embossing tool 33.

Figure 3F:
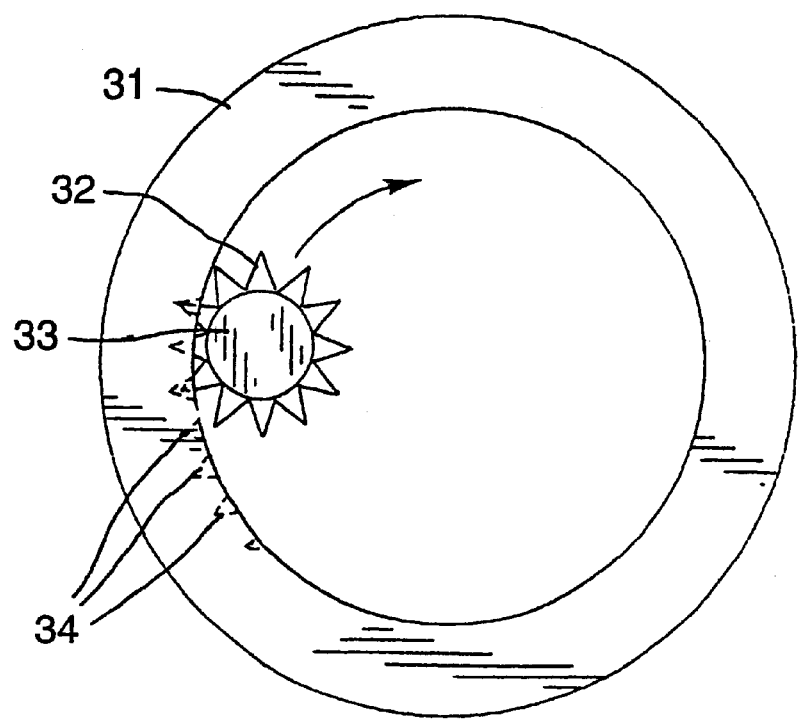
Figure 3G:
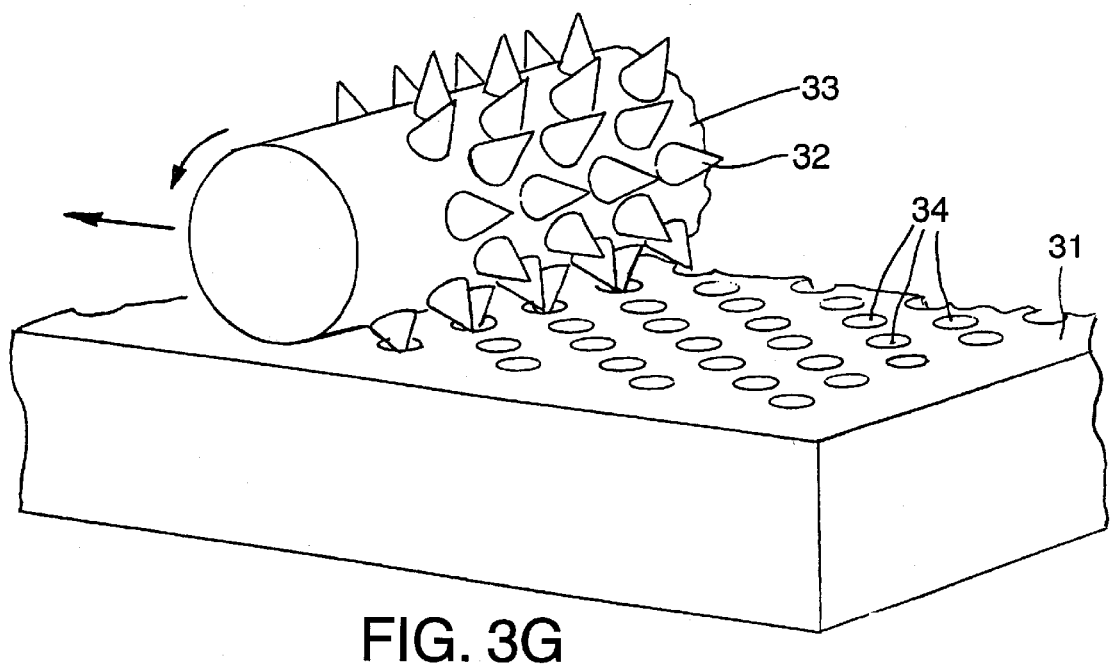

The embossing tool 33 for use in the present inventive method can be of any type suitable for impressing indentations 34 into the billet. The type of embossing tool depends upon a variety of parameters, such as the surface contours of the billet 31, the type of polymer, and the desired qualities of the polymeric embossed sheet products. One example of a suitable embossing tool 33 is a die (e.g., a metal die) having a plurality of protrusions 32. As depicted in FIGS. 3A, 3F, and 3G, some embossing tools 33 for use in the present inventive method are rotary spur-type embossing tools 33 which are rotated axially to bring successive protrusions 32 into contact with the surface of the billet 31. As depicted in FIGS. 3B–3C, another type of embossing tool 33 is a sheath-type embossing tool 33 with inwardly projecting radial protrusions 32. As depicted in FIGS. 3D and 3E, another type of embossing tool 33 is a press-type embossing tool 33 with protrusions 32 projecting from one surface. In addition to the depicted embossing tools, other types of embossing tools can be used within the scope of the present inventive method.

Embossing can be accomplished by any suitable technique, and the choice of embossing technique is controlled to a large extent by the characteristics of the billet 31 and the embossing tool 33. For example, a billet can be embossed by passing a rotary spur-type embossing tool 33 along the billet 31 tangentially to the surface of the billet 31 (FIGS. 3A and 3G). Alternatively, a billet 31 can be embossed by placing the billet 31 within a sheath-type embossing tool 33 (FIGS. 3B–3C), by contacting a billet 31 with a press-type embossing tool 33 (FIGS. 3D–3E), by embossing the inner surface of a hollow billet (FIG. 3F), or by other suitable means. As depicted in FIG. 3A, a cylindrical billet 31 is efficiently embossed while it is axially rotated (such as in the direction indicated by arrow a) relative to a rotary spur-type embossing tool 33 axially rotated in the opposite direction (such as in the direction indicated by arrow b). Regardless of the technique for embossing, however, the process of embossing introduces indentations 34 into a surface of the billet 31 as herein described.

Figure 5A:
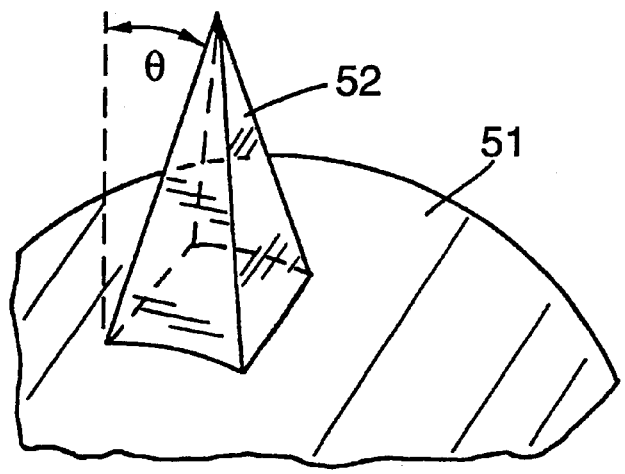
FIGS. 5A and 5B are schematic representations of different embodiments of tapered protrusions on an embossing tool.

An embossing tool 33 preferably has protrusions 32 for contacting the billet 31. protrusions 32 can form any desired array (e.g., a pattern or irregular array) on the embossing tool 33. Protrusions 32 can be spaced regularly or irregularly, and an array of protrusions 32 can be of any desired density (e.g., from about $1/cm^2$ to about $500/cm^2$, typically about $10/cm^2$ to about $100/cm^{2'}$). Where the embossing tool 33 is a rotary spur-type embossing tool 33, the protrusions 32 can form an irregular or linear array along the length of the embossing tool 32; alternatively, the protrusions 32 can form a helical array of any desired degree (helices of about 5°–75°, such as about 15°–60°, or even about 30°–45°, are typical). For example, a rotary spur-type embossing tool for forming an embossed sheet having the pattern with diamond openings as depicted in FIG. 7, has protrusions arranged in about a 45° spiral angle wherein opposite sides of the projections have an about 90° included angle (i.e. angle θ as indicated in FIG. 5A is about 45°). By varying the placement of the protrusions 32, the present inventive method can produce embossed sheets of varying qualities.

The protrusions 32 also can be of any suitable dimension for impressing indentations 34 into the billet 31. As the impression or hole size of a polymeric sheet is related to the width of the embossing tool protrusions 32 (as well as to the depth of the protrusion penetration), the exact dimensions of the protrusions 32 will vary depending upon the desired qualities of the polymeric embossed sheet product. Thus, for producing an embossed sheet having very small impressions or holes (e.g., a polymeric integral net capable of fine filtration), the protrusions 32 can have a maximal width at the level of penetration of less than about 20 μm; for example, a protrusion 32 can be less than about 10 μm (e.g., less than about 5 μm) wide at the level of penetration. It is within the scope of the present inventive method to employ embossing tools 33 with even smaller protrusions 32 to produce polymeric embossed sheets with small impressions (such as integral nets with very small holes or pores). Similarly, embossing tools 33 for producing embossed sheets or integral nets with larger impressions or holes will have protrusions 32 larger than this relatively small size (i.e., width at the level of penetration of about 20 μm wide or larger). For example, in many applications, protrusions 32 are up to about a millimeter wide at the level of penetration, while in other applications, protrusions 32 are up to about a centimeter wide at the level of penetration. It will be understood that protrusions 32 can be even significantly wider than these exemplified dimensions depending upon the desired properties of the polymeric embossed sheet product.

The height of the protrusions 32 limits the maximal depth of the indentations 34 into the billet 31; thus, longer protrusions 32 can emboss deeper indentations 34 than can shorter ones. Of course, the protrusions 32 need not be inserted to their full length into the billet 31 (i.e., a longer protrusion 32 can still emboss a relatively shallow indentation 34). Thus, protrusions 32 can be of any suitable height to produce indentations 34 of a desired depth. Depending upon the depth at which the embossed billet 31 is skived, deeper indentations 34 permit several layers of polymeric embossed sheet to be produced from a billet 31 which has been embossed only once. Furthermore, where the desired embossed sheet is an integral net, deeper indentations 34 permit thicker nets to be skived. Thus, in many applications, a protrusion 32 is relatively high in order to facilitate the removal of as much product as practicable from a billet 31 embossed once. Conversely, in other applications (e.g., in order to save the billet 31 for subsequent embossing with a different pattern of indentations 34), the protrusions 32 are shorter, and in many applications, protrusions 32 are so short as to penetrate the billet 31 only slightly. Moreover, an embossing tool 33 can have protrusions 32 of varying heights in order to produce indentations 34 of varying depths in the billet 31.

Protrusions 32 can be of any desired cross-sectional shape; thus, protrusions 32 can be tetragonal (e.g., rhomboids, rectangles, lozenges, etc.), round, ovoid, oblong, orthogonal, stelliform, or any other desired shape. Furthermore, embossing tools 33 can have protrusions 32 of uniform shape or of varied shape. Moreover, a protrusion 32 can change shape along its length (e.g., tetragonal at the base and round at the tip, or other suitable arrangement) in order to produce indentations 34 of varying shape. Thus, a billet 31, once embossed, can be successively skived to produce embossed sheets of varying qualities. Alternatively, the protrusions 32 can be such to impress groove-like indentations in the billet such that subsequent skiving will produce filaments (e.g., fibers), rather than an integral net with a lattice.

Figure 5B:
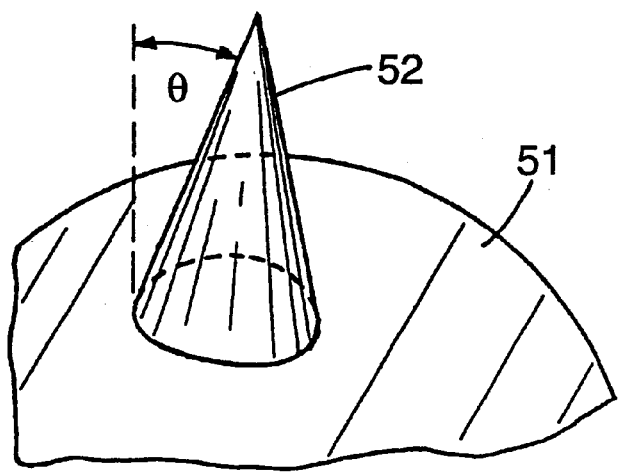

While the protrusions 32 can have any desired shape, they are preferably tapered. As depicted schematically in FIGS. 5A–5B, tapered protrusions 52 are either pyramidal (FIG. 5A) or conical (FIG. 5B). Most preferably, the protrusions 52 for forming the pattern with diamond openings depicted in FIG. 7 are pyramidal in shape. The taper can be outward or, preferably, inward from the base of the protrusion and can be of any degree θ, such as, for example, less than about 90° (i.e., included angle of less than about 180°), such as less than about 60° (i.e., included angle of less than about 120°), such as less than about 45° (i.e., included angle of less than about 90°), less than about 30° (i.e., included angle of less than about 60°), or even less than 15° (i.e., included angle of less than about 30°). Indeed, the tapered protrusions 52 can form pins having a very slight taper, e.g., θ of less than about 5° (i.e., an included angle of less than about 10°) and need not be tapered at all. However, preferably the protrusions 52 of the embossing tool 51 are uniformly tapered, and more preferably the projections have a 90° included angle (i.e., inward taper θ is about 45°). It will be observed in FIGS. 5A, 5B and 6 that where the protrusions 52 are tapered, the indentations 62 produced by the protrusions 52 are accordingly synclinal.

Because protrusions need not be inserted to their maximal depth into the billet during the embossing step, embossing tools having tapered protrusions are preferred because they afford a greater measure of control over the resulting embossed sheet. For example, by setting the depth into which the protrusions are inserted, the size of the indentations can be controlled. Thus, wider indentations can be embossed by inserting the protrusions to a greater depth.

As schematically depicted in FIGS. 4A–4B, subsequent to embossing, the present inventive method involves skiving the embossed billet 41, preferably by severably engaging the billet 41 with a blade 45. Any means of skiving the billet 41 is within the scope of the present inventive method. Thus, the billet 41 can be skived by passing the blade 45 through the billet 41 tangentially to the surface of the billet 41. However, the embossed billet 41 is more evenly skived by moving it relative to a stationary blade 45, and this method of skiving the billet is preferred. Thus, as depicted in FIG. 4A, a cylindrical billet is most evenly skived while it is axially rotated (as indicated by arrow a) to engage a stationary blade 45. Similarly, as depicted in FIG. 4B, a planar billet 41 is most evenly skived by moving it forward to engage a stationary blade (as indicated by arrow b).

The billet 41 can be skived at any depth relative to the depth of the impressed indentations 43. In many applications, the billet 41 is skived at a depth more shallow than the depth of the impressed indentations 43. It is thus seen that an embossed sheet 42 which is removed from the billet 41 by skiving is an integral net (i.e., a fenestrate sheet) because the embossed sheet 42 retains the pattern of indentations 43, 44 which have been introduced into the billet 41 by previously embossing the billet 41. In other applications, the billet 41 is skived at a depth exceeding the depth of the impressed indentations 43, producing an embossed sheet 42 that is not fenestrate but is thinner at the sites of the impressed indentations 43, 44 than at the lattice between the indentations 43, 44. If desired, such embossed sheets can be rendered fenestrate by subsequent treatment (e.g., stretching to rupture the thin portions at the regions of the impressed indentations).

Figure 6:
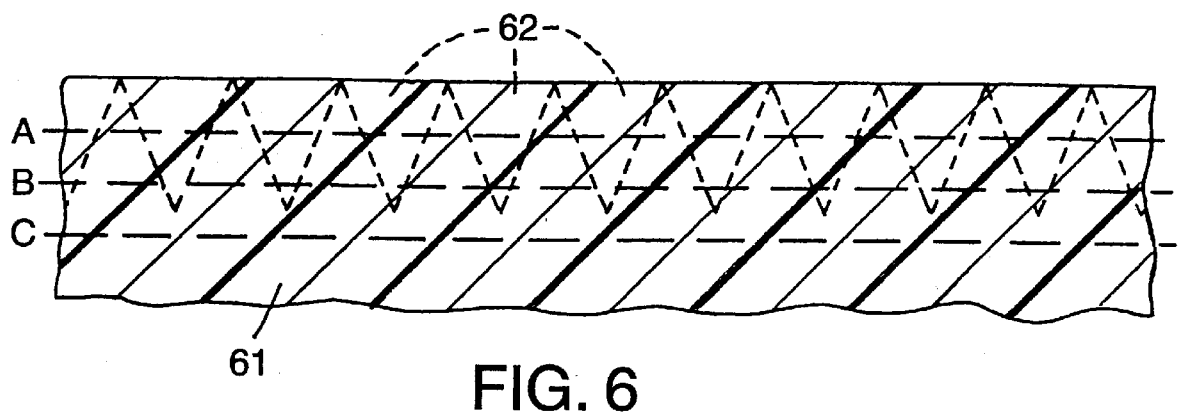
FIG. 6 is a cross-sectional schematic representation of a portion of a billet, including the billet surface, showing synclinal indentations produced from an embossing tool with tapered protrusions. Dashed lines A, B, and C represent three of many potential planes for skiving the embossed billet.

Skiving can be accomplished by any suitable technique, and the choice of skiving techniques is controlled to a large extent by the characteristics of the embossed billet 41. For example, as illustrated in FIG. 6, after being once embossed, a billet 61 with indentations 62 can be skived several times, for example at successive depths (e.g., dashed lines A, B, and C), to produce integral nets with different hole sizes (lines A and B) or non-fenestrate embossed sheets (line C). Also, as depicted in FIG. 4A, a cylindrical billet 41 once embossed can be skived in a spiral (e.g., a concentric spiral) to produce a single embossed sheet 42 from the billet. Moreover, as depicted in FIG. 2, a cylindrical billet 21 can be continuously embossed with a rotary spur-type embossing tool 22 and skived while it is rotated axially (such as indicated by arrow a) relative to a blade 25. Because the billet's diameter decreases as layers of embossed sheet 26 are spirally skived from the billet 21, the blade 25 can be continuously indexed against the billet 21, or the billet 21 can be continuously indexed towards the blade 25, to maintain a desired depth of skiving. Moreover, in order to maintain uniform pattern definition following skiving off of layers of embossed sheet, the embossing tool 22 can be continuously indexed against the billet 21, or the billet 21 can be continuously indexed towards the embossing tool 22. Thus, a continuous integral net with substantially uniform hole sizes can be produced from a cylindrical billet 21 of polymeric material.

As mentioned herein, the present inventive method preferably employs tapered embossing tool protrusions to impress synclinal indentations into the billet. As illustrated in FIG. 6, integral nets with pores or holes of varying dimensions can be produced from embossed billets 61 having synclinal indentations 62 by varying the depth at which the embossed billet 61 is subsequently skived (dashed lines A and B). For example, skiving an embossed billet 61 having synclinal indentations 62 at a relatively shallow depth (line A in FIG. 6) produces an integral net having relatively wider holes or pores and narrower lattice, while skiving the billet 61 at a deeper level (line B in FIG. 6) produces an integral net having relatively smaller holes or pores and wider lattice. Thus, according to the present inventive method, several separate integral nets, each with distinct hole sizes but each having the same pattern and spacing of pores or holes, can be produced from the same embossed billet 61 having synclinal indentations 62 by repeated skiving of the billet 61 at successively greater depths (lines A and B). Skiving the billet 61 at a level deeper than the depth of the indentations 62 (line C in FIG. 6) produces a non-fenestrate sheet. It should be noted that where the billet, once embossed, is to be skived successively, the hole size of successive layers skived from a billet with synclinal indentations will necessarily be narrower. As such, if uniformity in hole size as between successive layers is desired, either the billet must be re-embossed over the existing pattern prior to each successive skiving, or the protrusions of the embossing tool should not be tapered.

By controlling the processes of embossing and skiving the billet, an embossed sheet with a lattice of any suitable thickness can be produced, as previously described. For example, control over the embossing step can affect the lattice thickness. Displacement of billet material by the protrusions causes the surface of the billet to swell, as the total volume of the billet is not significantly altered during the embossing step. Thus, varying the dimensions of the embossing tool protrusions as well as the embossing depth affects the degree to which the billet is distended by the embossing step. Furthermore, by controlling the skiving process, the present inventive method can produce embossed sheets of variable lattice thickness or of uniform lattice thickness. Variable depth skiving can produce an embossed sheet lattice which is thicker in some places than in others, with the variations being either gradient or irregular. Furthermore, the shape of the blade (e.g., serrated, or otherwise non-uniform) can affect the thickness of the embossed sheet or net lattice. Of course, by controlling the skiving process, the present inventive method can produce embossed sheet lattices having approximately uniform thickness throughout, and even lattices having substantially uniform thickness.

In addition to the aforementioned steps of first embossing and subsequently skiving the polymeric billet, the present inventive method can include other steps as well. For example, the present inventive method can involve pretreating the billet of polymeric material in a suitable manner. The nature of the desired pretreatment will depend to a large extent upon the composition of the polymer, and such pretreatment is within the skill of the art. For example, the billet, or any portion thereof, can be heated prior to, or during, the embossing step so as to render the polymeric material more conducive to indentation during the embossing step. For example, the billet can be heated to a uniform temperature in an oven prior to embossing. Alternatively, the embossing tool can comprise a heating element for warming a surface of the billet during the embossing step. The temperature to which the billet is heated will depend upon the polymer. For thermoplastic polymers, the surface of the billet is heated to near the glass transition temperature. A PTFE billet preferably is heated to temperature above room temperature (e.g., above about 25° C.) up to about 185° C., more preferably from about 135° C. to about 165° C. (e.g., about 150° C.). Similarly, the surface of a billet comprising UHMWPE preferably is heated to a temperature above room temperature up to about 60° C., more preferably from about 50° C. to about 60° C. (e.g., about 55° C.) whereas the surface of a billet comprising PFA preferably is heated to a temperature above room temperature up to about 185° C., more preferably from about 135° C. to about 165° C. (e.g., about 150° C.).

The embossed sheet of polymeric material can be modified following skiving from the embossed billet. The nature of the desired modifications will depend to a large extent upon the composition of the polymer and the intended application for the embossed sheet. Such modifications are within the skill of the art. Thus, for example, one or both surfaces of the embossed sheet can be smoothed, heat-treated, annealed, coated, etc. Furthermore, embossed sheets produced by skiving the billet at a depth exceeding the depth of the indentations can be stretched subsequent to skiving in order to rupture the thin portions at the regions of the impressed indentations, thereby rendering them fenestrate (i.e., integral nets). Of course, the embossed sheet of polymeric material can be modified in any other suitable fashion.

In some applications, the present inventive method further comprises contacting the integral net with a second embossing device (or even two or more embossing devices, blades, serrated edges, etc.) such that, as illustrated in FIG. 7, punctate depressions 74 or furrows 74 are imprinted into a surface of the embossed sheet lattice 72 between some adjacent holes or indentations 73. The furrows 74 or depressions 74 need not be between every adjacent hole. In some applications, it may be desirable that the furrows 74 break through the lattice 72 so as to form fissures between some of the adjacent holes or indentations 73.

While the discussion herein has indicated means by which a billet can be embossed, the present inventive method need not employ the first step of embossing. In some applications, for example, a billet of polymeric material already may comprise a suitable array of indentations, such as those indentations described herein. Of course, such billets need not be further embossed for use in the present inventive method. In such embodiments, thus, the present invention provides a method for producing an embossed sheet from an embossed billet of polymeric material (i.e., a billet having a surface with one or more indentations deep to the surface of the billet) by skiving the embossed billet as described herein. By this method, an embossed sheet of polymeric material is removed from the billet.

The present method can produce polymeric embossed sheets substantially free from extractable matter. This is possible because the embossed sheet is produced without employing manipulations known to create or introduce extractable matter associated with the embossed sheet. Although the billet is contacted with the embossing tool and skiving blade as herein described, such manipulation at most introduces contaminating matter only at the surface of the embossed sheet, which matter is not integrated into the embossed sheet. Subsequently, the skived embossed sheet can be bathed or washed in a suitable fluid to remove any trace material deposits from the surface of the embossed sheet.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments can be used and that it is intended that the invention can be practiced otherwise than as specifically described herein. Accordingly, this invention includes all modifications encompassed within the spirit and scope of the invention as defined by the following claims.

What is claimed is:

1. A nonwoven, nonextruded, single-layer integral net comprising a lattice of polymeric material, having two opposing faces and a plurality of holes traversing the net from one face to the other face, wherein said lattice is prepared by contacting a billet of polymeric material with an embossing tool having a plurality of protrusions to provide an embossed billet, and skiving said embossed billet to provide a lattice that is substantially free of extractable matter.

2. The net of claim 1, wherein said polymeric material is thermoplastic material.

3. The net of claim 2, which consists essentially of said polymeric material.

4. The net of claim 2, wherein said thermoplastic material is a fluoropolymer.

5. The net of claim 4, which consists essentially of said polymeric material.

6. The net of claim 1, wherein said polymeric material is polytetrafluoroethylene-co-perfluoro(alkylvinyl ether).

7. The net of claim 1, wherein said polymeric material is ultra high molecular weight polyethylene.

8. The net of claim 1, wherein said polymeric material is polytetrafluoroethylene.

9. The net of claim 1, which consists essentially of said polymeric material.

10. The net of claim 9, having a plurality of holes traversing the net from one face to the other face.

11. The net of claim 9, which consists of said polymeric material.

12. The net of claim 1, wherein said lattice has not been stretched.

13. A filtration apparatus comprises a housing, a process fluid inlet arranged to direct process fluid into said housing, a permeate outlet arranged to direct permeate from said housing, at least one separation element disposed within said housing, and an integral net of claim 1, one face of which communicates with said process fluid inlet, and another face of which communicates with said permeate outlet.

14. A method of separating particulate matter from a process fluid employing the filtration apparatus of claim 13.

15. The net of claim 1, having a plurality of holes about 20 $\mu$m wide or larger traversing the net from one face to the other face.

16. The net of claim 1, wherein said polymeric material is thermoplastic material.

17. The net of claim 16, wherein said thermoplastic material is a fluoropolymer.

18. The net of claim 1, wherein said polymeric material is polytetrafluoroethylene-co-perfluoro(alkylvinyl ether).

19. The net of claim 1, wherein said polymeric material is ultra high molecular weight polyethylene.

20. The net of claim 1, wherein said polymeric material is polytetrafluoroethylene.

21. A nonwoven, nonextruded, single-layer integral net comprising a lattice of polymeric material having two opposing faces and at least one hole traversing the net from one face to the other face, wherein a face of said lattice comprises punctate depressions into a surface of said lattice.

22. The net of claim 21, wherein a depression forms a furrow between two adjacent holes of said net.

23. A nonwoven, nonextruded, single-layer integral net comprising a lattice of polymeric material comprising a fluoropolymer, having two opposing faces and a plurality of holes 20 µm wide or larger traversing the net from one face to the other face, wherein said lattice is prepared by contacting a billet of polymeric material with an embossing tool having a plurality of protrusions to provide an embossed billet, and skiving said embossed billet to provide a lattice that is substantially free of extractable fluoropolymer material.

24. The net of claim 12, wherein said polymeric material is polytetrafluoroethylene.

25. The net of claim 23, wherein said fluoropolymer material is polytetrafluoroethylene.

26. A nonwoven, nonextruded, single-layer integral net comprising a lattice of polymeric material comprising ultra high molecular weight polyethylene, having two opposing faces and a plurality of holes 20 µm wide or large traversing the net from one face to the other face, wherein said lattice is prepared by contacting a billet of polymeric material with an embossing tool having a plurality of protrusions to provide an embossed billet, and skiving said embossed billet to provide a lattice that is substantially free of extractable ultra high molecular weight polyethylene material.

* * * * *